United States Patent
Horlbeck et al.

[11] Patent Number: 5,821,524
[45] Date of Patent: Oct. 13, 1998

[54] METHOD AND APPARATUS FOR READING BAR CODED TUBULAR MEMBERS SUCH AS CYLINDRICAL VIALS

[75] Inventors: Eric G. Horlbeck, Plainsboro; James P. Mueller, Cranbury, both of N.J.

[73] Assignee: Pharmacopeia, Inc., Princeton, N.J.

[21] Appl. No.: 699,403

[22] Filed: Aug. 19, 1996

[51] Int. Cl.⁶ ............................................... G06K 7/10
[52] U.S. Cl. ........................ 235/483; 235/482; 422/104
[58] Field of Search .......................... 235/482, 483, 235/485, 495; 422/104

[56] References Cited

U.S. PATENT DOCUMENTS

| | | | |
|---|---|---|---|
| 1,071,289 | 8/1913 | Bader . | |
| 2,406,514 | 8/1946 | Squire | 81/19 |
| 2,899,132 | 8/1959 | Orthuber | 235/61.6 |
| 3,238,501 | 3/1966 | Mak et al. | 235/495 |
| 4,286,145 | 8/1981 | Palmer | 235/454 |
| 4,463,251 | 7/1984 | Koutonen et al. | 235/470 |
| 4,582,987 | 4/1986 | Bianco | 235/486 |
| 4,595,562 | 6/1986 | Liston et al. | 422/102 |
| 4,622,457 | 11/1986 | Bradley et al. | 235/375 |
| 4,642,470 | 2/1987 | Planke | 250/566 |
| 4,751,186 | 6/1988 | Baisch et al. | 422/104 |
| 4,816,649 | 3/1989 | Bianco et al. | 235/462 |
| 4,847,474 | 7/1989 | Engel et al. | 235/464 |
| 4,849,771 | 7/1989 | Lawrence et al. | 346/139 R |
| 4,855,909 | 8/1989 | Vincent et al. | 235/375 |
| 4,919,799 | 4/1990 | Menardi et al. | 209/538 |
| 4,960,984 | 10/1990 | Goldenfield et al. | 235/462 |
| 4,963,718 | 10/1990 | Hoshizaki et al. | 235/462 |
| 4,990,792 | 2/1991 | Frei | 250/566 |
| 5,028,769 | 7/1991 | Claypool et al. | 235/454 |
| 5,105,070 | 4/1992 | Wike, Jr. et al. | 235/467 |
| 5,286,959 | 2/1994 | Demachi | 235/462 |
| 5,397,542 | 3/1995 | Nelms et al. | 422/104 |
| 5,401,110 | 3/1995 | Neeley | 235/375 |
| 5,481,100 | 1/1996 | Terauchi | 235/462 |
| 5,651,941 | 7/1997 | Stark et al. | 422/104 |
| 5,670,117 | 9/1997 | Erb et al. | 422/104 |
| 5,739,520 | 4/1998 | Atsumi et al. | 235/483 |

FOREIGN PATENT DOCUMENTS

| | | |
|---|---|---|
| 0 425274 A2 | 5/1991 | European Pat. Off. . |
| 52-61061 | 5/1977 | Japan . |
| 63-208989 A | 8/1988 | Japan . |

*Primary Examiner*—Donald T. Hajec
*Assistant Examiner*—Mark Tremblay
*Attorney, Agent, or Firm*—Heslin & Rothenberg, P.C.

[57] ABSTRACT

An apparatus for electronically reading tubular members, such as cylindrical vials, marked with electronically readable encoded information is disclosed. The apparatus is in the form of a jig having a receiving means adapted to receive an electronic identification means, such as a pen-type bar code reader therein. A receptacle within the jig is adapted to receive a tubular member therein and to allow rotation of the tubular member. An electronic identification means may be placed within the receiving means to read information encoded on the tubular member when placed within the receptacle.

26 Claims, 3 Drawing Sheets

METHOD AND APPARATUS FOR READING BAR CODED TUBULAR MEMBERS SUCH AS CYLINDRICAL VIALS

FIELD OF THE INVENTION

This invention relates to the field of electronic scanning systems and, particularly, to a method and apparatus for reading bar coded tubular members.

BACKGROUND OF THE INVENTION

In various situations, certain items may be stored in tubular members which are electronically labelled and tracked using an electronic identification means such as a bar code reader. For example, in the field of combinatorial chemistry, during the preparation of encoded chemical libraries, groups of compounds may be stored in cylindrical vials. Each cylindrical vial may be electronically labelled using a bar code of any length circumferentially wrapped around the vial. The vials of sublibraries are tracked using an identification means such as a bar code reader. Typically, a conventional pen-type bar code reader is used to scan the bar coded label of each vial. The vial is rotated about its longitudinal axis while the bar code is in close proximity to the scanning end of the identification means to facilitate scanning of the encoded electronic information.

Typically, scanning of such cylindrical vials is done either by hand or by the use of a mechanical means. However, hand scanning of these cylindrical vials is not feasible because it requires a person to coordinate the movements of the identification means with the cylindrical vials. When the bar code is wrapped circumferentially about a vial, hand scanning may not be easily accomplished. Alternatively, various mechanical systems for scanning these circumferentially wrapped bar codes are complex and costly. These mechanical systems rotate a cylindrical vial about its longitudinal axis in proximity to an identification means. For example, in one type of mechanical bar code reader, a cup receives a cylindrical bar coded vial. The bottom of the cup then rotates, thereby rotating the vial and enabling the bar code to be read by an identification means. In other mechanical systems, robotic devices are used to hold the vial in close proximity to an identification means and then rotate the same.

It is, therefore, desirable to achieve an apparatus and method which are less costly and complex than the aforementioned mechanical systems for electronically reading tubular members marked with electronically readable encoded information.

It is also desirable that the aforementioned apparatus and method be used with any conventional identification means such as a pen-type bar code reader. The method and apparatus should facilitate rotation of the tubular member by either manual or mechanical means.

It is also desirable that the apparatus be compact and useable on a desk top to easily allow the reading of bar coded information about tubular members.

Such an apparatus should be useable, e.g., in a method of tracking cylindrical vials containing groups of chemical compounds made by combinatorial chemistry, by scanning bar code labels on the vials.

SUMMARY OF THE INVENTION

The aforementioned benefits and advantages may be realized with the apparatus for electronically reading tubular members marked with encoded information constructed in accordance with the principles of the present invention. The apparatus includes a jig having a receiving means adapted to receive a portable electronic identification means therein and a receptacle adapted to receive at least a portion of a tubular member therein while allowing the tubular member to be rotated therein. The receptacle is disposed to allow an identification means within the receiving means to read electronically encoded information on the portion of the tubular member. The identification means may comprise a pen-type bar code reader and the tubular member may comprise a cylindrical vial.

The receiving means may include at least one slot within the jig which may be formed within a top section of the jig and disposed to allow the identification means to lie lengthwise on the top section of the jig. Alternatively, the receiving means may comprise a first and second slot within a top section of the jig. A recessed section may be located between the first and second slots and may be sized to form a gap between a surface of the jig and the identification means positioned in the slots to enable the identification means to be manually engaged and disengaged. The identification means, when disposed within the first and second slots forming the receiving means, is oriented at an angle, preferably substantially perpendicularly, relative to the receptacle.

The jig may also include an opening at an end thereof adapted to allow the tubular member within the receptacle to be manually rotated using one finger. The receptacle may include an aperture located within the first side of the jig, which is sized to enable the cylindrical vial to be inserted therethrough.

The receptacle and the receiving means should be configured to allow the identification means to be placed in close proximity to the cylindrical vial to enable a bar code on the cylindrical vial to be accurately scanned.

In another aspect of the invention, an apparatus for reading bar coded cylindrical vials includes a jig having a receiving means adapted for receiving a hand-held identification means, such as a pen-type bar code reader, therein. A receptacle within the jig is disposed to receive the cylindrical vial with encoded information thereon. The receptacle is configured to allow rotation of the cylindrical vial. The identification means within the receiving means and the cylindrical vial within the receptacle are oriented at an angle to one another, preferably substantially perpendicularly, to allow the identification means to read the bar code of the cylindrical vial.

The apparatus constructed in accordance with the principles of the present invention may be used in a method of electronically reading information encoded on a tubular member. The method may include inserting an electronic identification means into a jig having a receiving means for an electronic identification means, placing a tubular member having electronically readable encoded information thereon into a receptacle within the jig, and reading the electronically encoded information using the electronic identification means. The tubular member may be removed and the process repeated using additional tubular members. The tubular members may comprise cylindrical vials which may be manually inserted into the jig. The cylindrical vials may contain groups of chemical compounds therein and the encoded information may relate to the identities of the chemical compounds within each cylinder. The cylindrical vials may be rotated manually, e.g., by hand or using a device comparable to a violin bow, within the jig to facilitate scanning of the encoded information and/or into the receptacle through an aperture located within the side of the jig.

DETAILED DESCRIPTION OF THE DRAWINGS

Figure 1:
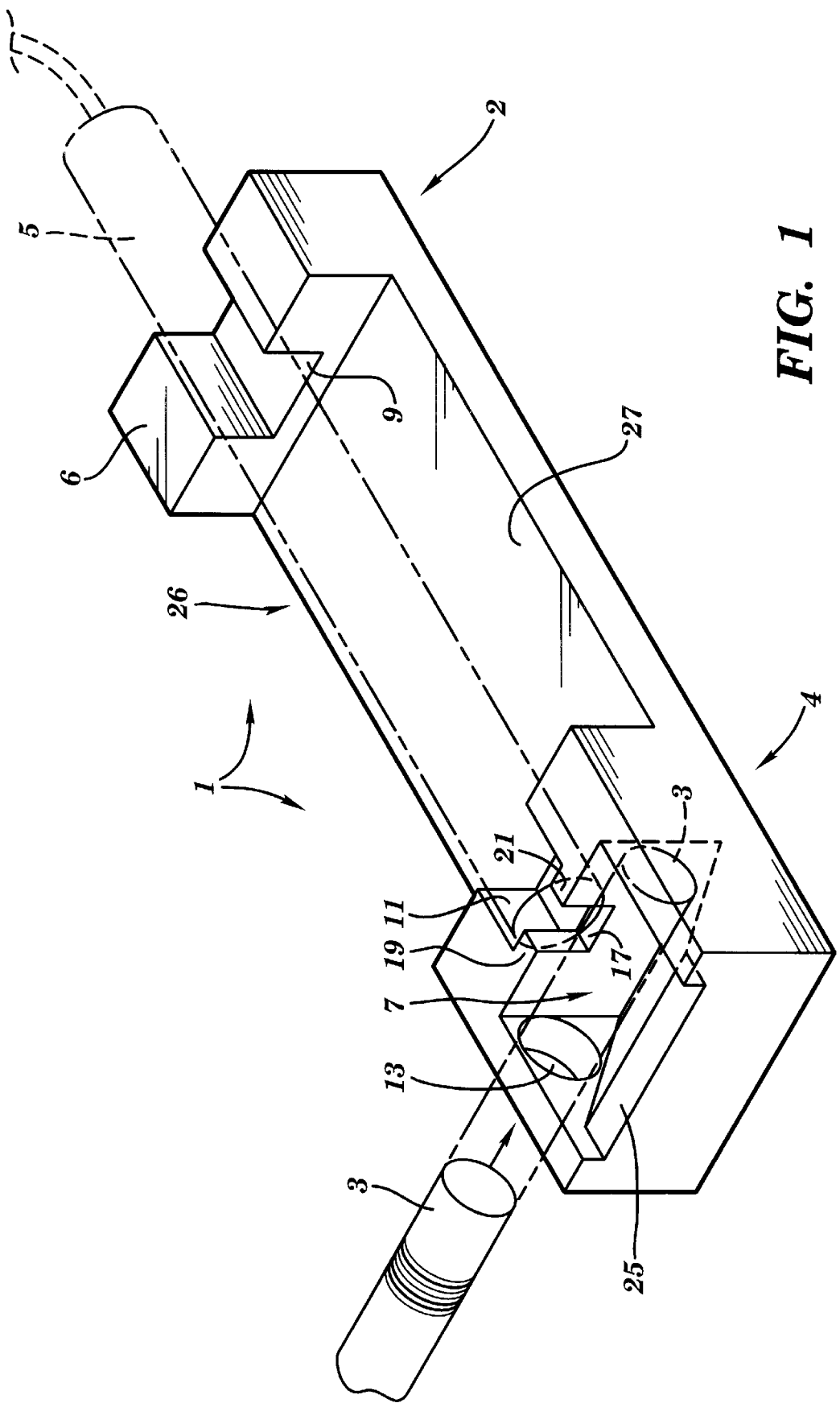
FIG. 1 depicts an isometric view of a jig constructed in accordance with the principles of the present invention with a bar coded cylindrical vial and identification means inserted therein.

Referring to FIG. 1, a jig 1 constructed in accordance with the principles of the present invention is shown. The jig 1, described in more detail infra, is shown with a tubular member, such as a cylindrical vial 3, and an identification means 5, inserted therein. As shown in FIG. 1, a conventional portable elongate identification means 5, e.g., a pen-type bar code reader or scanner, is disposed within a first slot 9 and second slot 11. The pen-type bar code reader extends between a first end 2 and a second end 4 of the jig. In this position, the end of the identification means 5 containing the sensor which reads electronically encoded information is placed in proximity to the bar code of the cylindrical vial 3 to read electronic information encoded thereon after the cylindrical vial 3 has been inserted into a receptacle 7 located at the second end 4 of the jig. The receptacle 7 is disposed perpendicularly to the identification means 5 so that when the cylindrical vial 3 is placed therein it is also oriented perpendicularly to the identification means 5.

The cylindrical vial 3 may be placed within he receptacle 7 by inserting the same through an aperture 13 located at the second end 4 of the jig 1. A window 17, defined by flanges 19, 21, is located between the receptacle 7 and second slot 11. The flanges 19, 21, located between the receptacle 7 and second slot, define a side of the receptacle and an end of the receiving means. The flanges 19, 21 extend perpendicularly from the side of the second slot 11 to form the end of the second slot 11. The flanges 19, 21 allow the surface of the cylindrical vial 3 having the encoded information thereon to be exposed to the end of the identification means 5 which reads the electronic information. However, the first flange 19 and second flange 21 should be of a thickness which prevents the identification means 5 from contacting the vial 3 while enabling the encoded information thereon to be read by the identification means 5.

The first slot 9 may be formed at the first end 2 of the jig 1 on a top section 6 thereof. The second slot 11 may be formed towards the second end 4 of the jig but also on the top section 6 thereof. The first slot 9 and second slot 11 should be of a width sufficient to receive the identification means 5 while also preventing excessive movement of the identification means therein. The identification means 5 should not shift into a position where the electronically encoded information on the cylindrical vial 3 cannot be read.

Recessed area 26, located between the first slot 9 and the second slot 11 is formed within the top section 6 of the jig 1. The recessed area 26 is defined by a surface 27 on the top section 6 of the jig located below the first slot 9 and second slot 11 to form a gap between the identification means 5 within the first and second slots and the surface of the recessed area 27. This gap enables the identification means 5 to be readily grasped with a hand or other means. In an alternative embodiment, the recessed area is formed as a bowl-shaped hollow in top section 6.

The receptacle 7 is located at the second end 4 of the jig 1 and is configured to receive a tubular member such as the cylindrical vial 3 therein while allowing the same to be rotated about its longitudinal axis. To facilitate manual rotation of the cylindrical vial, the receptacle 7 may be exposed at the second end 4 of the jig 1 so that a person may place a finger directly into the receptacle and rotate the vial 3. An opening 25 located at the intersection of second end 4 and top section 6 of the jig 1 allows the vial 3 to be exposed within the receptacle for manual rotation at a sufficiently even speed to allow for scanning or other manipulation manually by a person.

Figure 2:
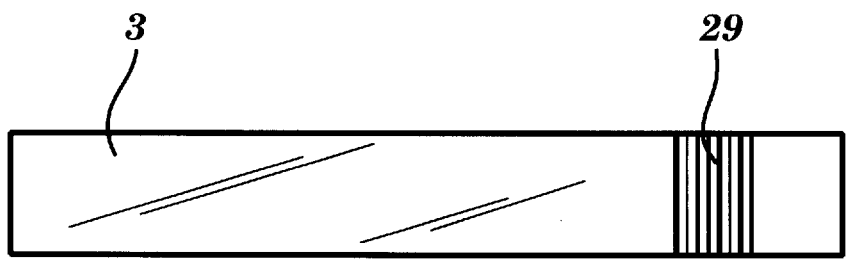
FIG. 2 depicts a front view of a cylindrical vial having a bar code located at an end thereof about its entire circumference.
Figure 3:
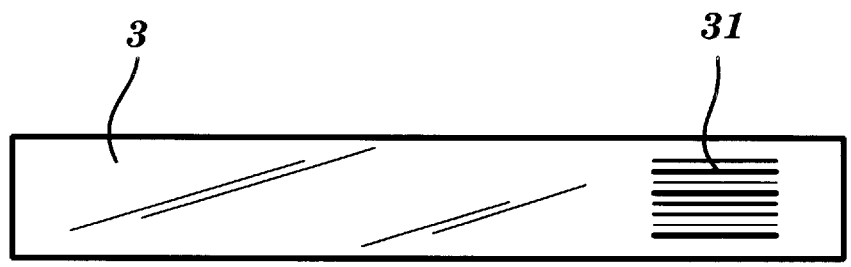
FIG. 3 depicts a front view of another embodiment of a cylindrical vial having a bar code located at an end thereof.

The jig 1, as shown in FIG. 1, may be used to facilitate the scanning of encoded information on tubular members such as cylindrical vials. An example of such a vial 3 having a bar code thereon is shown in FIG. 2. Information relating to the vial and its contents may be encoded on a label having a bar code which is wrapped around the vial. The term "wrapped" is meant to encompass embodiments wherein the bar code is physically attached to, or etched into, the inner or outer surface of the vial. The length of the bar code 29 is less than or equal to the circumference of the vial, as shown in FIG. 2, and may vary according to the amount of information to be stored thereon. Alternatively, a bar code 31 may be located at the end of the vial without extending therearound, as shown in FIG. 3. Such a cylinder may be used, e.g., in combinatorial chemistry where libraries and sublibraries of chemical compounds are created. Typically, cylindrical vials are used to store groups of chemical compounds, and information pertaining to such compounds is encoded by the bar code. Large numbers of groups of chemical compounds and cylindrical vials containing the same may be tracked by scanning the bar codes on each vial.

Figure 4:
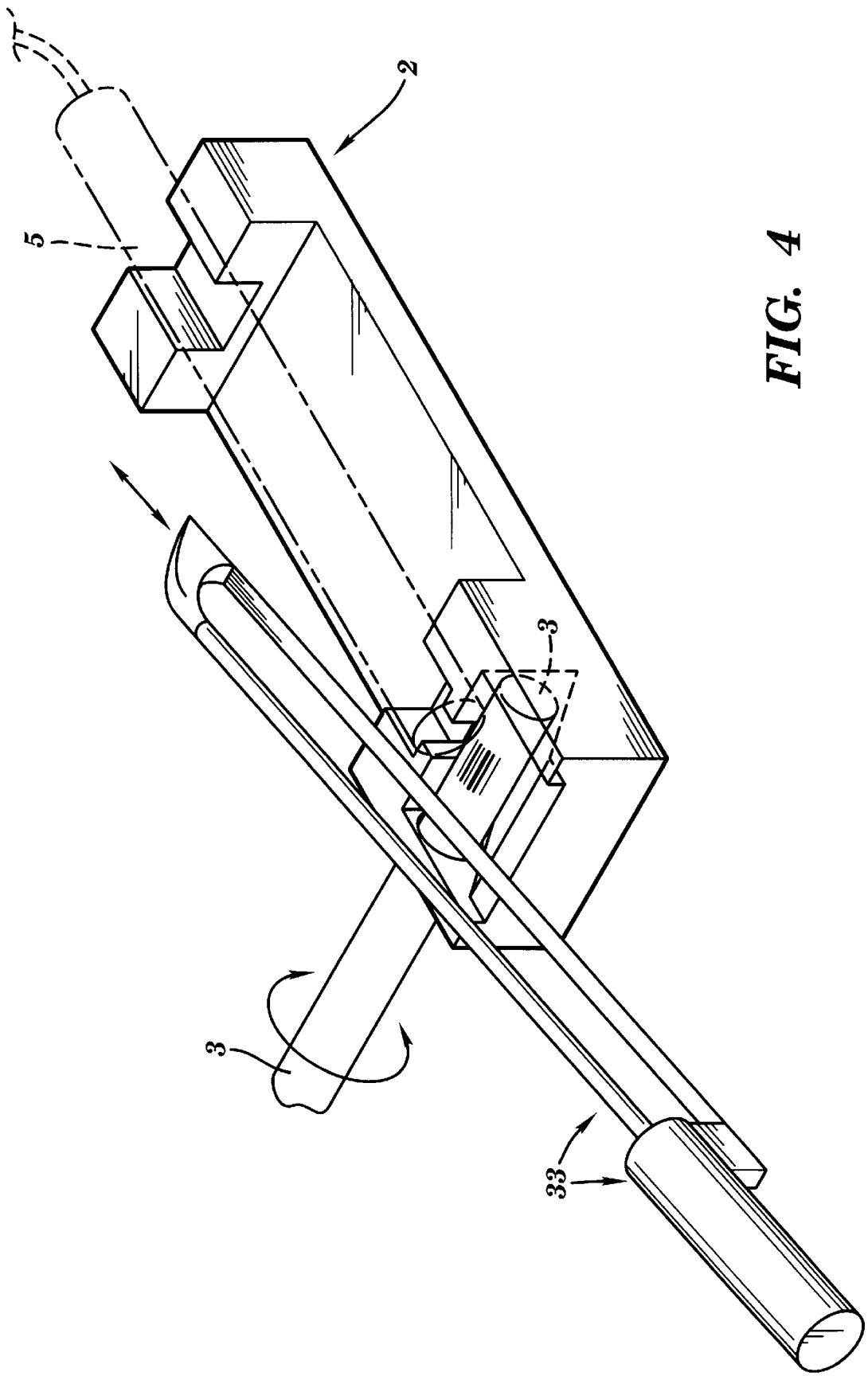
FIG. 4 depicts an isometric view of the jig depicted in FIG. 1 along with a bow disposed in a position to rotate the bar coded cylindrical vial therein.

Referring again to FIG. 1, a bar coded cylinder, for example, a cylindrical vial containing a group of chemical compounds, may be inserted into the receptacle 7 of the jig 1 and the identification means 5 may be placed within the slots 9, 11. The bar code can then be read by the identification means 5 and the information thereon electronically displayed and/or recorded in a computer (not shown) interfaced with the identification means 5 to track the vial 3. If necessary, the vial 3 can be manually rotated, to facilitate scanning, at a sufficiently even speed using a single finger, multiple fingers, an object such as a "violin bow," or the palm of a hand drawn across the opening 25. A bow 33 similar to a "violin bow", such as that shown in FIG. 4, may be used to rotate the vial 3 by translating the same tangentially about the vial's circumference. The bow 33 should be made of a material which inputs sufficient frictional forces on the vial 3 to rotate the same. Alternatively, the vial 3 can be rotated by a mechanical means which could be driven by a motor, if desired. After a first vial is scanned it can then be manually or mechanically removed and another vial inserted into the receptacle 7 for scanning. This process can be repeated continuously until all bar coded vials are scanned by the identification means 5. Using this technique, many vials containing groups of chemical compounds used in combinatorial chemistry can be tracked and information relating thereto recorded.

The jig constructed in accordance with the principles of the present invention provides a simple, economical apparatus for allowing tubular members such as cylindrical vials with bar codes thereon to be easily scanned. The jig can be economically stamped from a single block of material such as plastic or even metal, injection molded from plastic or rubber, or cut from conventional materials including wood. Alternatively, the jig may be assembled from pieces of these and other materials including cardboard. The jig is intended to be compact, enabling the same to be used on a desktop or the like.

Although the invention has been described in connection with the embodiments depicted herein, it will be apparent to one of ordinary skill in the art that various modifications may be made to the invention including the jig depicted herein. Any such modifications are intended to be within the scope of the invention as defined by the following claims.

What is claimed is:

1. An apparatus for electronically reading a tubular member encoded with electronically readable information, said apparatus comprising:

a jig;

receiving means adapted to receive and retain a portable electronic identification means within said jig, said identification means being manually removable from said jig; and a receptacle within said jig adapted to receive and retain at least a portion of the tubular member therein and to allow rotation of said tubular member therein, said tubular member being encoded on said portion with electronically readable information, said receptacle being disposed to allow said identification means retained within said receiving means to read the encoded information on said portion of said tubular member.

2. The apparatus of claim 1 wherein said receiving means comprises at least one slot within said jig.

3. The apparatus of claim 2 wherein said slot is formed within a first section of the jig, said slot being disposed to allow said identification means to lie lengthwise on said first section of said jig.

4. The apparatus of claim 3 wherein said receiving means comprises a first and a second slot within a top section of said jig, said jig further comprising a recessed section between said first and second slots, said recessed section being sized to form a gap between a surface of said jig and said identification means disposed in said slots, to enable said identification means to be manually engaged and disengaged.

5. The apparatus of claim 4 wherein said identification means disposed in said first and second slots is oriented substantially perpendicularly to said receptacle.

6. The apparatus of claim 5 further comprising an opening located at an end of said jig adapted to allow said tubular member within the receptacle to be manually rotated.

7. The apparatus of claim 1 or 6 wherein said identification means comprises a pen-type bar code reader.

8. The apparatus of claim 6 further comprising an object adapted to contact said tubular member within said receptacle wherein said tubular member may be rotated upon translation of said object tangentially about said tubular member.

9. The apparatus of claim 6 wherein said object comprises a bow.

10. The apparatus of claim 9 wherein said receptacle further comprises an aperture, said aperture being sized to enable said tubular member to be inserted into the receptacle therethrough.

11. The apparatus of claim 1 or 10 wherein said tubular member comprises a cylindrical vial.

12. The apparatus of claim 11 wherein the vial is labelled circumferentially with a bar code.

13. An apparatus for reading bar coded cylindrical vials comprising:

a jig having a receiving means adapted for receiving and retaining a pen-type bar code reader therein, said bar code reader being manually removable from said receiving means;

a receptacle within said jig disposed to receive and retain a cylindrical vial therein, said cylindrical vial having a bar code with encoded information thereon, said receptacle being configured to allow rotation of said cylindrical vial therein, wherein said bar code reader retained within said receiving means and said cylindrical vial retained within said receptacle are oriented to allow said bar code reader to read said bar code from the cylindrical vial.

14. A method of electronically reading information encoded on a first tubular member, said method comprising:

inserting an electronic identification means into a jig, said jig comprising a receiving means for receiving and retaining said electronic identification means within said jig, said electronic identification means being manually removable from said jig;

placing a tubular member having electronically readable encoded information thereon into a receptacle within said jig wherein said tubular member is disposed to allow said electronic identification means retained within said jig to read said electronically encoded information;

reading said electronically encoded information using said electronic identification means.

15. The method of claim 14 further comprising removing said tubular member.

16. The method of claim 15 further comprising repeating said inserting, placing and reading steps using at least a second tubular member.

17. The method of claim 16 wherein said first tubular member comprises a cylindrical vial.

18. The method of claim 17 wherein said electronic identification means is manually inserted into said jig.

19. The method of claim 17 wherein said identification means comprises a pen-type bar code reader.

20. The method of claim 19 wherein said receiving means comprises at least one slot within said jig.

21. The method of claim 20 wherein said slot is formed within a top section of the jig, said slot being disposed to allow said pen-type bar code reader to lie lengthwise on said top section of said jig.

22. The method of claim 21 when said cylindrical vial contains a group of chemical compounds and wherein said electronically encoded information pertains to the identities of said compounds.

23. The method of claim 22 further comprising rotating said cylindrical vial.

24. The method of claim 23 wherein said receiving means comprises a first and second slot within a top section of said jig, said jig further comprising a recessed section between said first and second slots, said recessed section being sized to form a gap between a surface of said jig and said pen-type bar code reader disposed in said slots to enable said identification means to be manually engaged.

25. The method of claim 24 wherein said first and second slots are oriented so that said pen-type bar code reader disposed within said slots is oriented substantially perpendicularly to said cylindrical vial disposed within said receptacle.

26. The method of claim 25 wherein placing said cylindrical vial into said receptacle comprises inserting said cylindrical vial into an aperture within said jig.

* * * * *